US012397941B2

(12) United States Patent
Oumi et al.

(10) Patent No.: US 12,397,941 B2
(45) **Date of Patent: *Aug. 26, 2025**

(54) DRUG SUPPLY APPARATUS

(71) Applicant: PHC Holdings Corporation, Tokyo (JP)

(72) Inventors: Syou Oumi, Ehime (JP); Shiyouji Shibata, Ehime (JP); Toshiaki Ueta, Tokushima (JP)

(73) Assignee: PHC HOLDINGS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/615,822

(22) Filed: Mar. 25, 2024

(65) Prior Publication Data

US 2024/0228086 A1 Jul. 11, 2024

Related U.S. Application Data

(63) Continuation of application No. PCT/JP2022/035521, filed on Sep. 22, 2022.

(30) Foreign Application Priority Data

Sep. 29, 2021 (JP) ................................ 2021-159495

(51) Int. Cl.
*B65B 9/087* (2012.01)
*A61J 3/00* (2006.01)
(Continued)

(52) U.S. Cl.
CPC ................. *B65B 9/087* (2013.01); *A61J 3/00* (2013.01); *B65B 9/02* (2013.01); *B65B 41/16* (2013.01); *B65B 51/16* (2013.01)

(58) Field of Classification Search
None
See application file for complete search history.

(56) References Cited

U.S. PATENT DOCUMENTS

2017/0301087 A1* 10/2017 Yuyama .................... A61J 1/03

FOREIGN PATENT DOCUMENTS

JP 59-016805 U 2/1984
JP 2010023999 A * 2/2010 ......... B65H 19/1852
JP 5577526 B2 8/2014

OTHER PUBLICATIONS

Machine Translation of JP-2010023999-A (Year: 2025).*
(Continued)

*Primary Examiner* — Veronica Martin
(74) *Attorney, Agent, or Firm* — Rimon P.C.

(57) ABSTRACT

A drug supply apparatus of the present disclosure includes a drug supply unit configured to supply a drug to a drug delivery position; a downstream conveying unit configured to convey a strip-shaped first drug packaging paper, folded in half in advance along its longitudinal direction and configured to receive a drug at the drug delivery position; and an upstream conveying unit configured to convey a strip-shaped second drug packaging paper, folded in half in advance along its longitudinal direction. In the apparatus, the upstream conveying unit conveys the second drug packaging paper toward the first drug packaging paper in such a way that the downstream end part of the second drug packaging paper holds in its inside the upstream end part of the first drug packaging paper, and the ridge line of the second drug packaging paper overlaps the ridge line of the first drug packaging paper.

8 Claims, 8 Drawing Sheets

(51) Int. Cl.

| | |
|---|---|
| ***B65B 9/02*** | (2006.01) |
| ***B65B 41/16*** | (2006.01) |
| ***B65B 51/16*** | (2006.01) |

(56) References Cited

OTHER PUBLICATIONS

International Search Report dated Nov. 22, 2022 issued in International Patent Application No. PCT/JP2022/035521, with English translation.

Extended European Search Report dated Apr. 14, 2025 issued in the corresponding European Patent Application No. 1 22876073.2.

* cited by examiner

DRUG SUPPLY APPARATUS

CROSS-REFERENCE OF RELATED APPLICATIONS

This is a Continuation of International Application No. PCT/JP2022/035521, filed on Sep. 22, 2022, which claims priority to Japanese Patent Application No. 2021-159495, filed on Sep. 29, 2021, the entire disclosures each of which are hereby incorporated by reference.

TECHNICAL FIELD

The present disclosure relates to a drug supply apparatus.

BACKGROUND ART

Patent Literature (hereinafter, referred to as PTL) 1 discloses a packaging paper connecting apparatus that connects the terminal end of packaging paper, which has been folded in half in advance along the longitudinal direction thereof and is used to package a drug, to the starting end of new packaging paper. An operator manually overlaps the terminal end of the packaging paper to be replaced and the starting end of the new packaging paper, and places the overlapped portions at a predetermined position. As the operator connects the overlapped portions to each other, the terminal end of the packaging paper to be replaced and the starting end of the new packaging paper are connected.

CITATION LIST

Patent Literature

PTL 1
Japanese Patent No. 5577526

SUMMARY OF INVENTION

Technical Problem

In the packaging paper connecting apparatus of PTL 1, an operator manually replaces packaging paper. On the other hand, automation of packaging paper replacement is being promoted for the purpose of increasing the efficiency of the work for the packaging paper replacement. During the replacement of packaging paper, when new packaging paper is automatically conveyed, the leading edge of new packaging paper may be caught by a guide that guides the new packaging paper, for example. In such a case, folds are generated in the new packaging paper, and thus the new packaging paper cannot be smoothly conveyed.

An object of the present disclosure is to smoothly convey packaging paper during the replacement of packaging paper in a drug supply apparatus.

Solution to Problem

A drug supply apparatus of the present disclosure includes the following: a drug supply unit configured to supply a drug to a drug delivery position; a downstream conveying unit configured to convey a first drug packaging paper that is strip shaped and folded in half in advance along a longitudinal direction of the first drug packaging paper, in which the first drug packaging paper is configured to receive a drug at the drug delivery position; and an upstream conveying unit configured to convey a second drug packaging paper that is strip shaped and folded in half in advance along a longitudinal direction of the second drug packaging paper, in which the upstream conveying unit conveys the second drug packaging paper toward the first drug packaging paper in such a way that a downstream end part of the second drug packaging paper holds, in an inside of the downstream end part, an upstream end part of the first drug packaging paper, and a ridge line of the second drug packaging paper overlaps a ridge line of the first drug packaging paper.

Advantageous Effects of Invention

A drug supply apparatus of the present disclosure is capable of smoothly conveying packaging paper during the replacement of packaging paper.

DESCRIPTION OF EMBODIMENTS

Hereinafter, at least one embodiment of the drug supply apparatus of the present disclosure will be described with reference to the drawings. In the following description, the side where operation part 11 is disposed is referred to as the front of drug supply apparatus 1, and the opposite side is referred to as the back of drug supply apparatus 1 as indicated by the arrows in FIG. 1. In addition, the left and right sides of drug supply apparatus 1 when viewed from the front thereof are referred to as the left and right of drug supply apparatus 1, respectively. The side away from the surface on which drug supply apparatus 1 is installed is referred to as the top of drug supply apparatus 1 (upward or above the apparatus), and the opposite side is referred to as the bottom of drug supply apparatus 1 (downward or below the apparatus).

Figure 1:
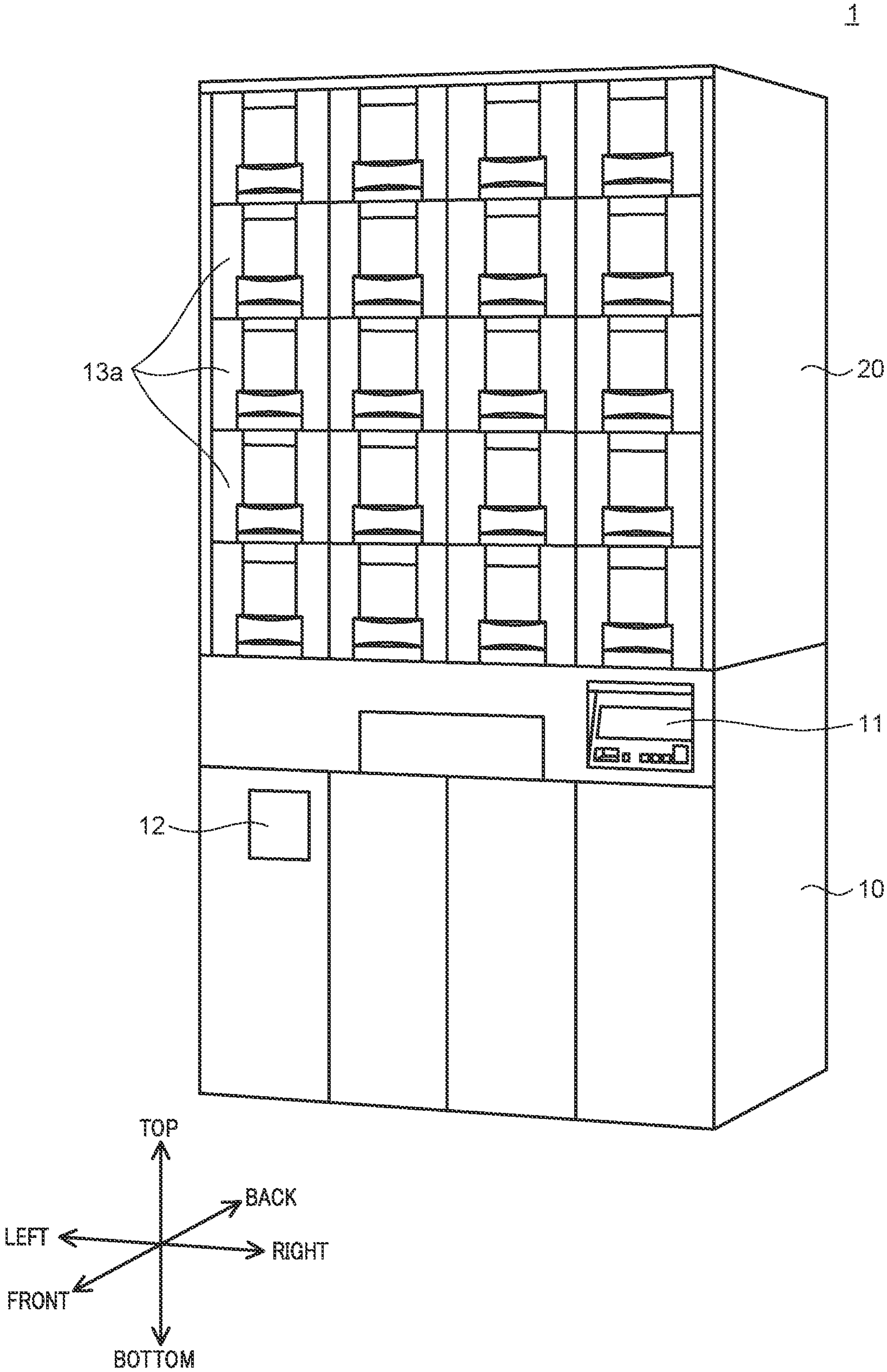
FIG. 1 is a perspective view of a drug supply apparatus according to an embodiment of the present disclosure.

FIG. 1 is a perspective view of exemplary drug supply apparatus 1. Drug supply apparatus 1 includes first floor part 10 and second floor part 20.

First floor part 10 includes operation part 11 and take-out part 12. In addition, first floor part 10 includes an input part (not illustrated).

Operation part 11 is a device to be operated by an operator, and includes, for example, a display, operation buttons, and the like. Various information is input to drug supply apparatus 1 as the operator operates operation part 11.

A drug (herein, a drug may be more than one drug) packaged in drug supply apparatus 1 is taken out from take-out part 12. Take-out part 12 includes an opening, and the operator takes out the drug from the opening.

The input part is an input device receiving various information input from an external device. The input part is connected to, for example, a personal computer, and receives input from the personal computer, for example, information on a prescription issued at a medical institution.

Figure 2:
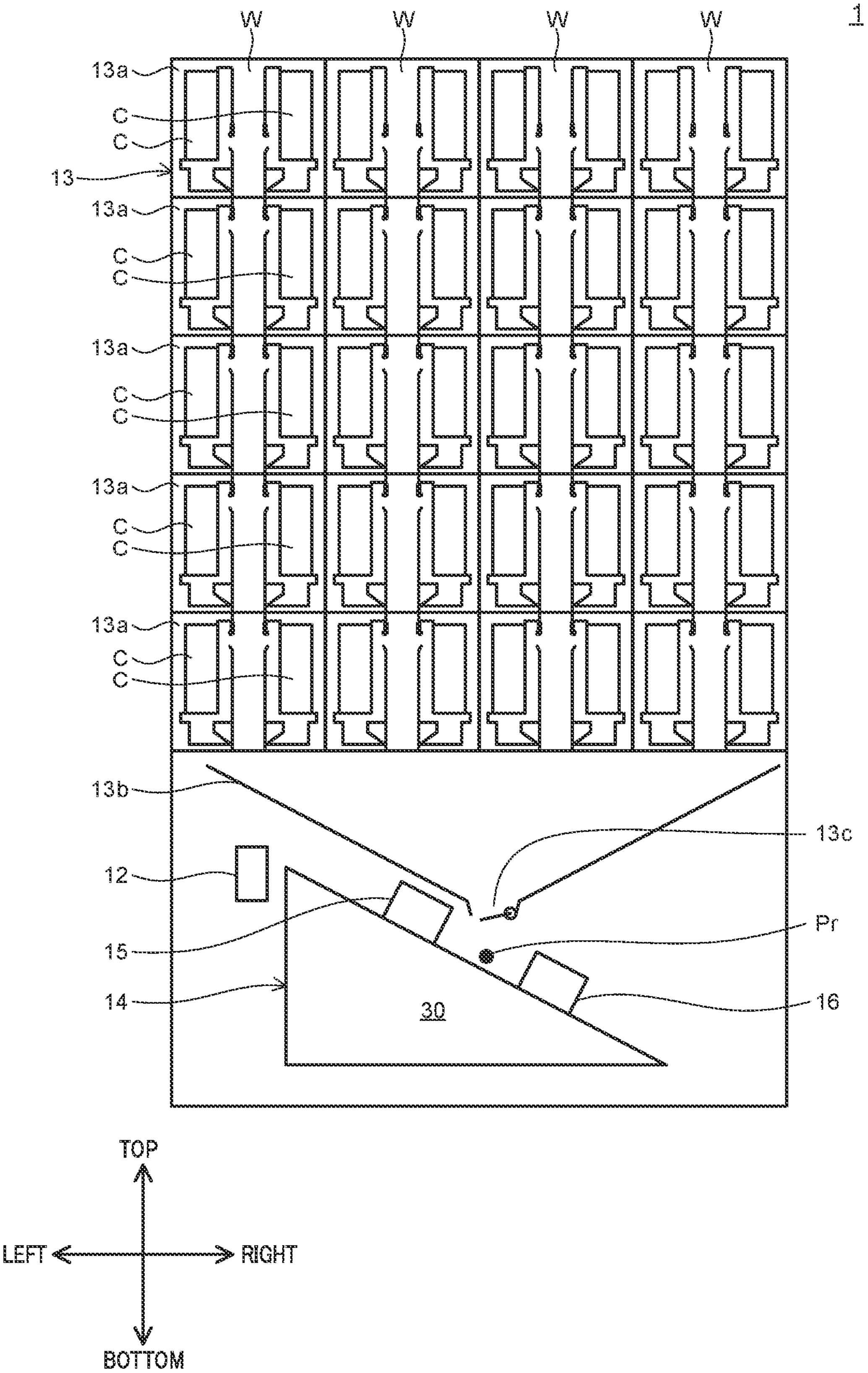
FIG. 2 is a longitudinal cross-sectional view of the drug supply apparatus.

As illustrated in FIG. 2, drug supply apparatus 1 includes drug supply unit 13, packaging unit 14, and control part (not illustrated) which performs overall control of drug supply apparatus 1. Drug supply unit 13 is configured to supply a drug to drug delivery position Pr. Drug supply unit 13 includes a plurality of shelves 13*a* and hopper 13*b*.

The plurality of shelves 13*a* are each configured to store the plurality of cassettes C in the second floor part. Drug supply apparatus 1 includes 20 shelves 13*a*. The plurality of shelves 13*a* are arranged in five stages in the up-down direction and in four rows in the left-right direction. The number and arrangement of shelves 13*a* provided in second floor part 20 are not limited to those of the present embodiment, and the number of stages in the up-down direction and/or the number of rows in the left-right direction may be more or less than those described above.

A plurality of cassettes C are stored in each shelf 13*a* so as to be arranged on shelf 13*a* along the front and rear direction on both sides of shelf 13*a* in the left-right direction. Each cassette C stores a plurality of drugs. Each cassette C is configured to discharge one tablet of a drug at a time.

The drug discharged from cassette C falls through passage W and is led to first floor part 10. Passage W is provided so as to penetrate each shelf 13*a* in the up-down direction.

Hopper 13*b* is configured to receive the drug led to first floor part 10, and lead the received drug through outlet 13*c* to drug delivery position Pr in packaging unit 14. Outlet 13*c* is provided approximately at the center of hopper 13*b*.

Packaging unit 14 is configured to package the drug led out from hopper 13*b*. Packaging unit 14 includes conveying part 30, printer 15, and sealing device 16.

Conveying part 30 is configured to convey strip-shaped packaging paper for packaging a drug. Details of conveying part 30 will be described below.

Printer 15 is a printing machine for printing, for example, the patient's name, the name of the drug to be supplied in packaging paper conveyed by conveying part 30, the date and time of administration, and the like on the surface of the packaging paper.

Sealing device 16 is for sealing the packaging paper in which a drug is wrapped.

The packaging paper in which the drug is enclosed is cut, for example, with predetermined timing and is conveyed toward take-out part 12 with the conveyance direction thereof changed by conveying part 30.

Figure 3:
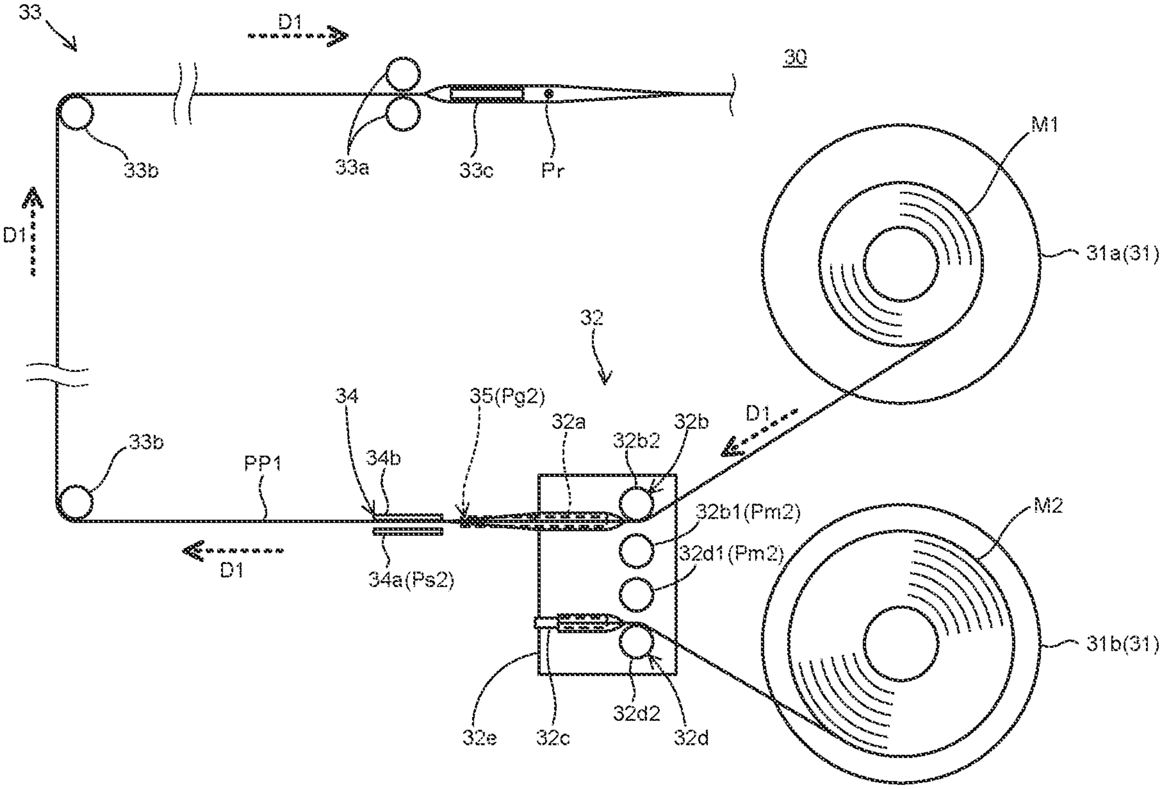
FIG. 3 schematically illustrates a portion of a conveying part.

In the following, conveying part 30 will be described. As illustrated in FIG. 3, conveying part 30 includes packaging paper holding part 31, upstream conveying unit 32, downstream conveying unit 33, holding member 34, and guide member 35. The broken line arrow in FIG. 3 indicates conveyance direction D1 of first drug packaging paper PP1.

Packaging paper holding part 31 includes first packaging paper holding part 31*a* and second packaging paper holding part 31*b*. First packaging paper holding part 31*a* rotatably holds roll M1, which is a package of strip-shaped first drug packaging paper PP1 having been folded in half in advance along the longitudinal direction of first drug packaging paper PP1. Second packaging paper holding part 31*b* rotatably holds roll M2, which is a package of strip-shaped second drug packaging paper PP2 having been folded in half in advance along the longitudinal direction of second drug packaging paper PP2. The packages of first drug packaging paper PP1 and second drug packaging paper PP2 may be first drug packaging paper PP1 in folds and second drug packaging paper PP2 in folds.

First packaging paper holding part 31*a* and second packaging paper holding part 31*b* can be exchanged for each other. That is, first packaging paper holding part 31*a* can hold roll M2, and second packaging paper holding part 31*b* can hold roll M1. In this case, a pair of rollers 32*b* described below nip (i.e., hold the drug packaging paper between the rollers) and convey second drug packaging paper PP2, and another pair of rollers 32*d* guide first drug packaging paper PP1 without nipping the drug packaging paper.

Upstream conveying unit 32 includes upstream guide member 32*a*, a pair of rollers 32*b*, another upstream guide member 32*c*, the other pair of rollers 32*d*, and moving member 32*e*.

Figure 4:
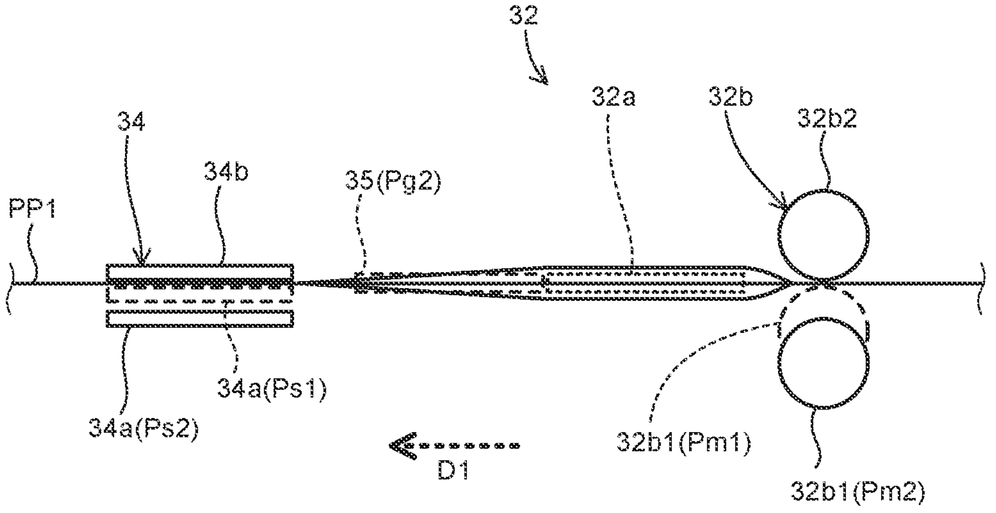
FIG. 4 is a partially enlarged view of FIG. 3.
Figure 5:
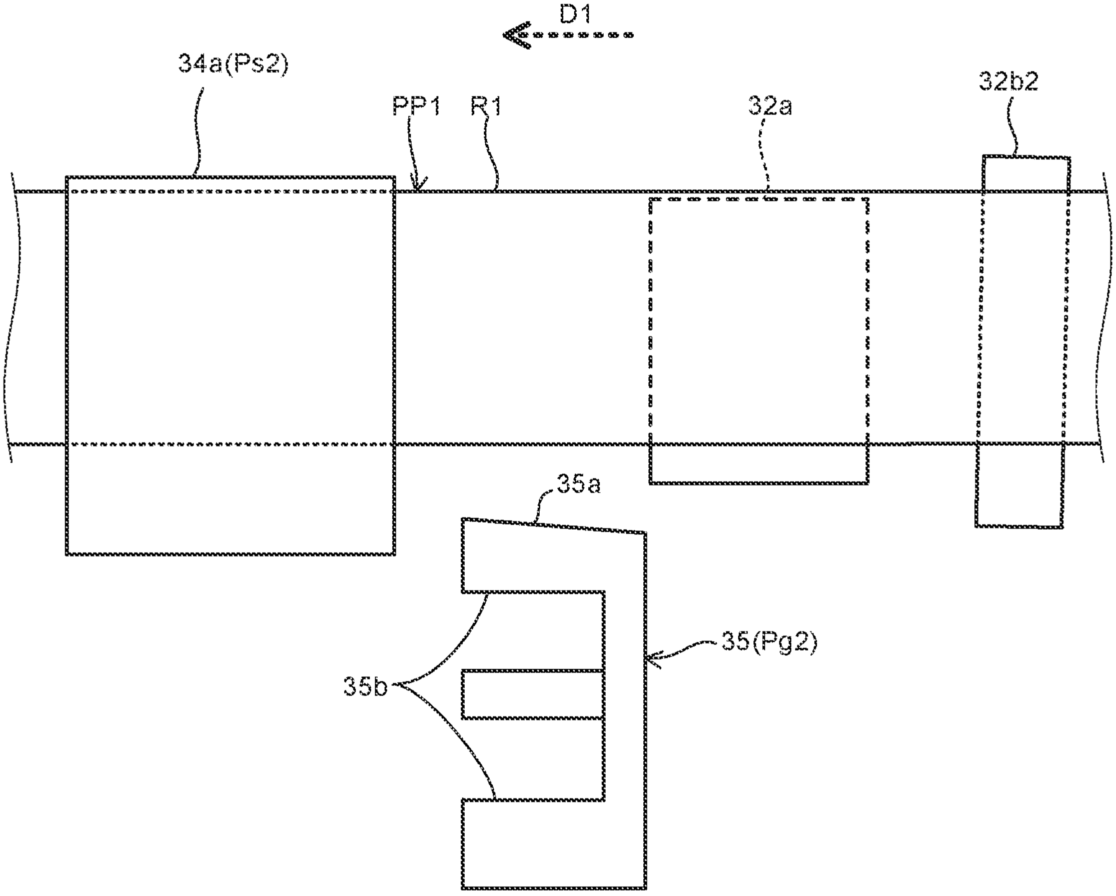
FIG. 5 illustrates the side and a periphery of first drug packaging paper in FIG. 4.

Upstream guide member 32*a* is configured to guide along conveyance direction D1 first drug packaging paper PP1 fed out from first packaging paper holding part 31*a*. Upstream guide member 32*a* is a plate-shaped member sandwiched by first drug packaging paper PP1. As illustrated in FIGS. 4 and 5, which are an enlarged view and a side view of upstream conveying unit 32 and holding member 34 and the peripheries thereof, upstream guide member 32*a* is disposed in such a way that the side surface thereof coinciding with ridge line R1 of first drug packaging paper PP1 is along conveyance direction D1.

The pair of rollers 32*b* guide first drug packaging paper PP1 without nipping the drug packaging paper. The pair of rollers 32*b* are disposed on the upstream side of first drug packaging paper PP1 from upstream guide member 32*a*. The pair of rollers 32*b* each have a cylindrical shape. The pair of rollers 32*b* include driving roller 32*b*1 and driven roller 32*b*2.

Driving roller 32*b*1 is configured to be rotated by a drive device (not illustrated) such as a motor. Driving roller 32*b*1 is disposed in such a way that the rotational axis thereof is parallel to the plate surface of upstream guide member 32*a* and orthogonal to conveyance direction D1 of first drug packaging paper PP1. In addition, driving roller 32*b*1 contacts the side surface of first drug packaging paper PP1, thereby having a function of changing conveyance direction D1 (see FIG. 3).

In addition, driving roller 32*b*1 is configured to move toward driven roller 32*b*2 to be located at conveying position Pm1, or to move away from driven roller 32*b*2 to be located at non-conveying position Pm2. When driving roller 32*b*1 is located at conveying position Pm1, the pair of rollers 32*b* can hold first drug packaging paper PP1 or second drug packaging paper PP2 located between the rollers and convey the drug packaging paper toward the downstream side.

Driven roller 32*b*2 is disposed with the rotational axis thereof inclined. That is, driven roller 32*b*2 is disposed in such a way that one end part of driven roller 32*b*2 (on the opened side of first drug packaging paper PP1) is located on the downstream side of first drug packaging paper PP1 from the other end part of driven roller 32*b*2 (on the ridge line R1 side of first drug packaging paper PP1). In addition, driven roller 32*b*2 contacts the side surface of first drug packaging paper PP1, thereby having a function of changing conveyance direction D1 (see FIG. 3).

Returning to FIG. 3, the description will be continued. The other upstream guide member 32*c* is a plate-shaped member sandwiched by the downstream end part of second drug packaging paper PP2 fed out from second packaging paper holding part 31*b*. The other upstream guide member 32*c* is disposed in such a way that the plate surface thereof is parallel to the plate surface of upstream guide member 32*a*, and the side surface thereof coinciding with ridge line R2 of second drug packaging paper PP2 is located on the same plane as the side surface of upstream guide member 32*a* coinciding with ridge line R1. The plate thickness of the other upstream guide member 32*c* is approximately the same as the plate thickness of upstream guide member 32*a*. As will be described below, at the time of replacing first drug packaging paper PP1 with second drug packaging paper PP2, the other upstream guide member 32*c* guides second drug packaging paper PP2.

The other pair of rollers 32*d* are disposed on the upstream side of second drug packaging paper PP2 from the other upstream guide member 32*c*. The other pair of rollers 32*d* are stationary with the downstream end part of second drug packaging paper PP2 located between the rollers. As will be described below, at the time of replacing first drug packaging paper PP1 with second drug packaging paper PP2, the other pair of rollers 32*d* nip and convey second drug packaging paper PP2.

The other pair of rollers 32*d* each have a cylindrical shape. The other pair of rollers 32*d* include driving roller 32*d*1 and driven roller 32*d*2.

Driving roller 32*d*1 is configured to be rotated by a drive device (not illustrated) such as a motor. Driving roller 32*d*1 is disposed in such a way that the rotational axis thereof is parallel to the plate surface of the other upstream guide member 32*c* and orthogonal to conveyance direction D1 of first drug packaging paper PP1.

In addition, driving roller 32*d*1 is configured to move toward driven roller 32*d*2 to be located at conveying position Pm1, or to move away from driven roller 32*d*2 to be located at non-conveying position Pm2. When driving roller 32*d*1 is located at conveying position Pm1, the other pair of rollers 32*d* can nip first drug packaging paper PP1 or second drug packaging paper PP2 located between the rollers and convey the drug packaging paper toward the downstream side.

Driven roller 32*d*2 is disposed with the rotational axis thereof inclined. That is, driven roller 32*d*2 is disposed in such a way that one end part of driven roller 32*d*2 (on the opened side of second drug packaging paper PP2) is located on the downstream side of second drug packaging paper PP2 from the other end part of driven roller 32*d*2 (on the ridge line R2 side of second drug packaging paper PP2). In addition, driven roller 32*d*2 contacts the side surface of second drug packaging paper PP2, thereby having a function of changing the conveyance direction of second drug packaging paper PP2.

Moving member 32*e* is configured to be able to move upstream guide member 32*a*, the pair of rollers 32*b*, the other upstream guide member 32*c*, and the other pair of rollers 32*d*, at the time of replacing first drug packaging paper PP1 with second drug packaging paper PP2. At the time of replacing first drug packaging paper PP1 with second drug packaging paper PP2, the other upstream guide member 32*c* moves to the position where upstream guide member 32*a* has been located before upstream guide member 32*a* is moved, and the other pair of rollers 32*d* moves to the position where the pair of rollers 32*b* have been located before the pair of rollers 32*b* are moved.

Downstream conveying unit 33 is configured to convey first drug packaging paper PP1 guided by upstream conveying unit 32 to printer 15 and sealing device 16. Downstream conveying unit 33 conveys first drug packaging paper PP1 in such a way that first drug packaging paper PP1 receives a drug at drug delivery position Pr.

Downstream conveying unit 33 includes a pair of downstream rollers 33*a* that nip and convey first drug packaging paper PP1, a plurality of rollers 33*b* that change conveyance direction D1 of first drug packaging paper PP1, and downstream guide member 33*c*.

Downstream guide member 33*c* is a plate-shaped member sandwiched by first drug packaging paper PP1, and configured to guide first drug packaging paper PP1 to drug delivery position Pr. Downstream guide member 33*c* is disposed in such a way that the plate surface thereof is orthogonal to the horizontal direction. First drug packaging paper PP1 hold, in its inside, downstream guide member 33*c* with the opened side of the drug packaging paper facing upward (herein, "in its inside" does not necessarily mean that a component is completely in the inside of another component). First drug packaging paper PP1 is opened upward by being guided by downstream guide member 33*c*, and receives a drug led out from hopper 13*b* at drug delivery position Pr.

Holding member 34 is disposed between upstream conveying unit 32 and downstream conveying unit 33. Holding member 34 does not hold first drug packaging paper PP1 when conveying part 30 is conveying first drug packaging paper PP1. Holding member 34 holds first drug packaging paper PP1 between the members thereof when first drug packaging paper PP1 is to be replaced with second drug packaging paper PP2, as described below. Holding member 34 is composed of a pair of plate members 34*a* and 34*b*. The pair of plate members 34*a* and 34*b* are disposed in such a way that the plate surfaces of the members are parallel to the plate surface of upstream guide member 32*a*. As illustrated in FIG. 4, first plate member 34*a* and second plate member 34*b* are configured to be located at holding position Ps1 where the members hold first drug packaging paper PP1 therebeteen or at a non-holding position Ps2 where the members does not hold first drug packaging paper PP1 therebeteen.

Guide member 35 is disposed between holding member 34 and upstream conveying unit 32, as illustrated in FIGS. 3 to 5, and configured to guide second drug packaging paper PP2 when first drug packaging paper PP1 is to be replaced with second drug packaging paper PP2, as described below. Guide member 35 is a plate-shaped member. The plate thickness of guide member 35 is substantially the same as the plate thicknesses of upstream guide member 32*a* and the other upstream guide member 32*c*.

Figure 8:
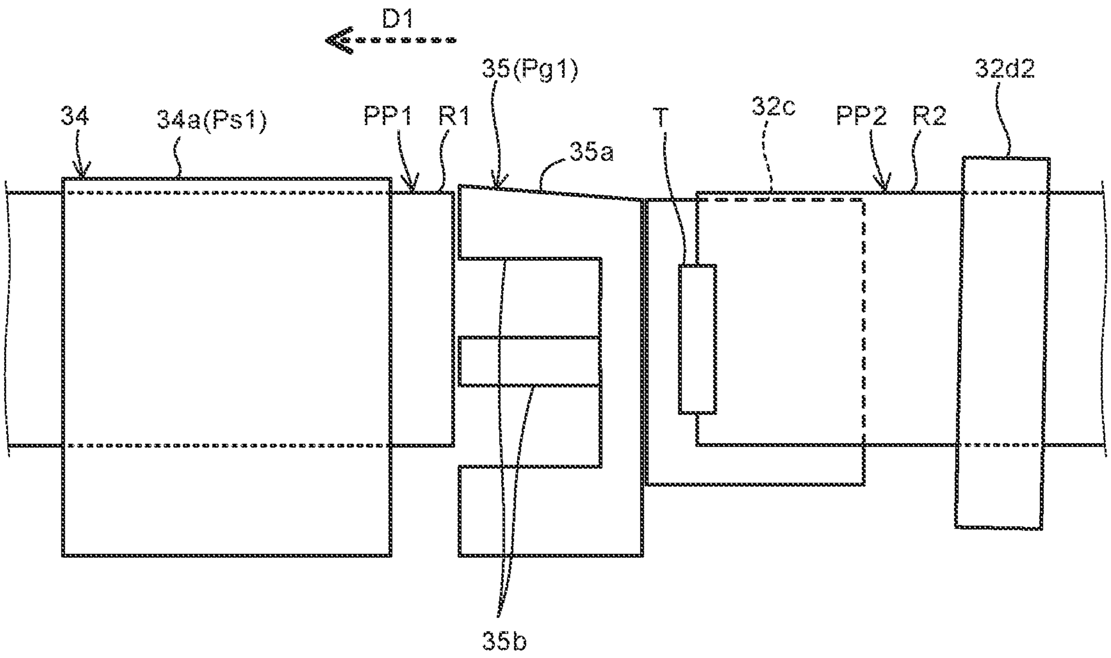
FIG. 8 illustrates the side and a periphery of the first drug packaging paper in FIG. 7.

During the conveyance of first drug packaging paper PP1 by upstream conveying unit 32 and downstream conveying unit 33, guide member 35 is located at non-guide position Pg2—a position where the guide member does not contact first drug packaging paper PP1, as illustrated in FIG. 5. As illustrated in FIG. 8 (which will be referred to later), at the time of replacing first drug packaging paper PP1 with second drug packaging paper PP2, guide member 35 is located at guide position Pg1—a position where the guide member can guide second drug packaging paper PP2. That is, guide member 35 is configured to be movable between guide position Pg1 and non-guide position Pg2. Guide member 35 includes inclined part 35*a* and recessed part 35*b*.

Inclined part 35*a* is a side portion of guide member 35, and ridge line R2 of second drug packaging paper PP2 overlaps the side portion at the time of guiding second drug packaging paper PP2 by guide member 35. Inclined part 35*a* extends in a direction substantially parallel to ridge line R2 of second drug packaging paper PP2 guided by guide member 35. Specifically, inclined part 35*a* has a shape such that the inclined part is inclined from the opened side toward the ridge line R2 side of second drug packaging paper PP2 as the inclined part approaches the downstream side from the upstream side of second drug packaging paper PP2. Inclined part 35*a* has a flat shape. Inclined part 35*a* may have a triangular cross section or an arcuate cross section.

Recessed part 35*b* is a portion recessed approximately along conveyance direction D1 from the side portion (downstream in conveyance direction D1) of guide member 35.

In the following, the operation of drug supply apparatus 1 when first drug packaging paper PP1 is to be replaced with second drug packaging paper PP2 will be described.

As illustrated FIGS. 3 to 5, when conveying part 30 is conveying first drug packaging paper PP1, driving roller 32*b*1 is located at the non-conveying position Pm2, first plate member 34*a* of holding member 34 is located at the non-holding position Ps2, and guide member 35 is located at non-guide position Pg2. In addition, upstream guide member 32*a* guides first drug packaging paper PP1 while upstream guide member 32*a* is sandwiched by first drug packaging paper PP1.

For replacing the first drug packaging paper PP1 with second drug packaging paper PP2, the operator inputs into operation part 11 an instruction to replace the packaging paper. Accordingly, the control part stops the operation of drug supply unit 13 and also stops the operation of the pair of downstream rollers 33*a*.

Figure 6:
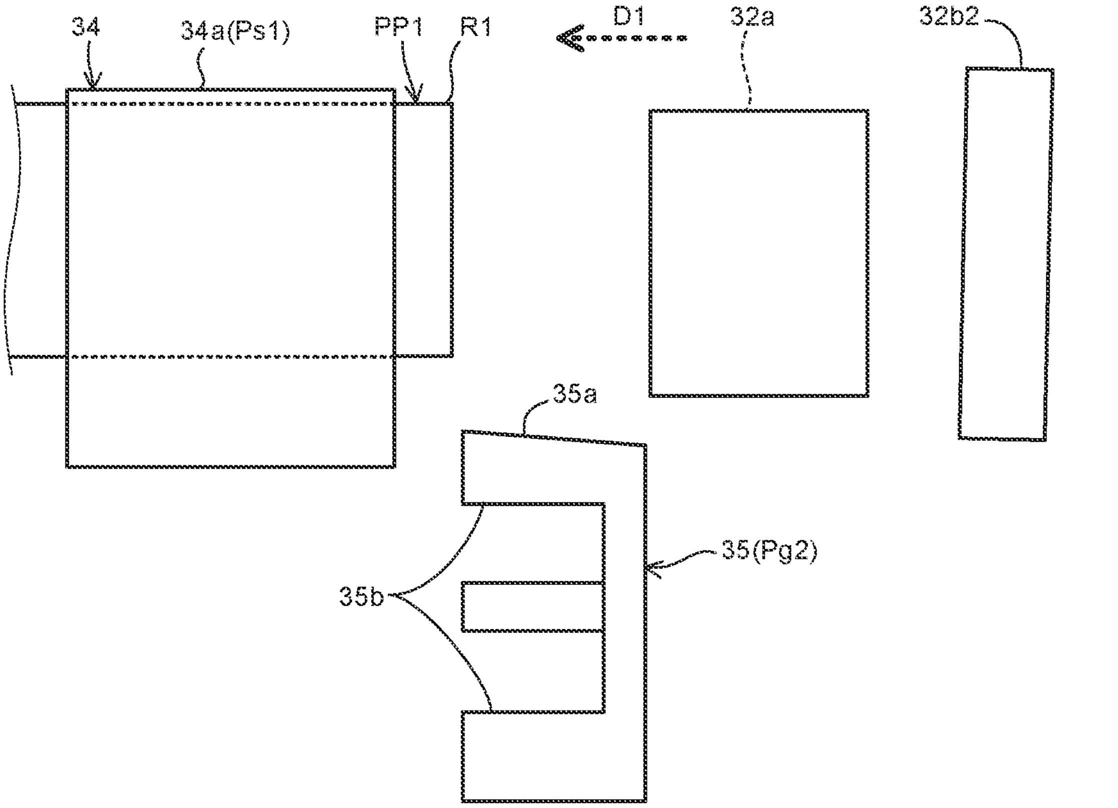
FIG. 6 illustrates a state in which the first drug packaging paper has been cut.

Subsequently, the control part moves first plate member 34*a* to holding position Ps1. As a result, holding member 34 holds first drug packaging paper PP1 between the members thereof. The operator then cuts first drug packaging paper PP1 on the downstream side from holding member 34, as illustrated in FIG. 6. At this time, the operator cuts first drug packaging paper PP1 in such a way that the downstream end of first drug packaging paper PP1 to be formed by the cutting is located between holding member 34 and guide member 35 located at guide position Pg1. The cutting of first drug packaging paper PP1 may be performed automatically. That is, the following configuration is also possible: conveying part 30 includes a blade for cutting first drug packaging paper PP1, and this blade automatically cuts first drug packaging paper PP1 when the above-described instruction is input to operation part 11.

Figure 7:
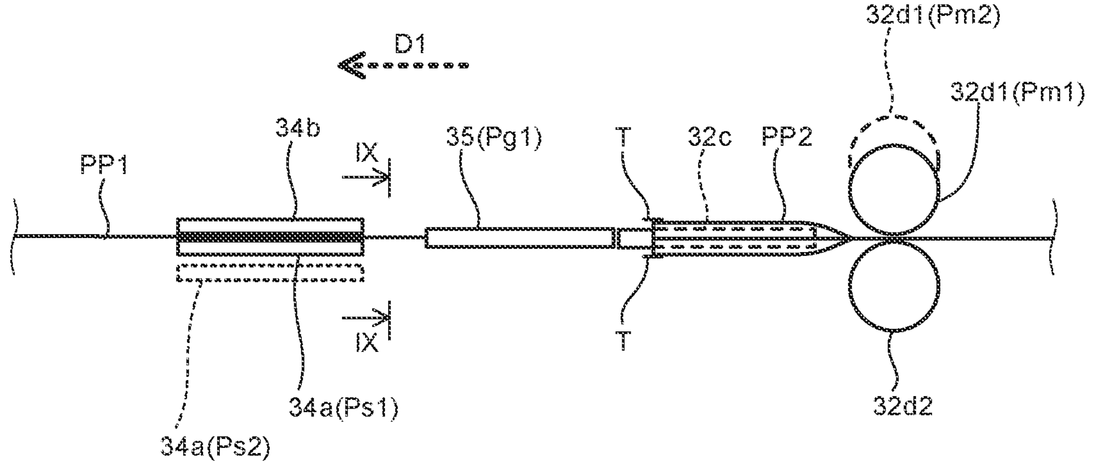
FIG. 7 illustrates a state immediately before second drug packaging paper is conveyed.

Further, the control part moves driving roller 32*d*1 of the other pair of rollers 32*d* so that the other pair of rollers 32*d* hold the downstream end part of second drug packaging paper PP2 therebetween. In this state, the control part activates moving member 32*e* to move upstream guide member 32*a*, the pair of rollers 32*b*, the other upstream guide member 32*c*, and the other pair of rollers 32*d*. Due to this movement, the other upstream guide member 32*c* is located at the position where upstream guide member 32*a* was located, and the other pair of rollers 32*d* are located at the position where the pair of rollers 32*b* were located. FIG. 7 illustrates the state at this time.

At this time, the operator attaches adhesive tape T to the downstream end part of second drug packaging paper PP2 so as to protrude from the downstream end of the drug packaging paper as illustrated in FIGS. 7 and 8. Adhesive tapes T are attached to both outer surfaces of second drug packaging paper PP2, which is folded in half. Adhesive tape T may be attached to second drug packaging paper PP2 in advance before moving member 32*e* is activated, that is, in a state illustrated in FIG. 3.

Subsequently, the operator inputs into operation part 11 information to start conveying second drug packaging paper PP2. The control part accordingly moves guide member 35 to guide position Pg1 as illustrated in FIG. 8. The other pair of rollers 32*d* hold second drug packaging paper PP2 therebetween. Subsequently, the control part rotates driving roller 32*d*1 to convey second drug packaging paper PP2.

As illustrated in FIG. 8, driven roller 32*d*2 is disposed in such a way that one end part of driven roller 32*d*2 (on the opened side of second drug packaging paper PP2) is located on the downstream side of second drug packaging paper PP2 from the other end part of driven roller 32*d*2 (on the ridge line R2 side of second drug packaging paper PP2) as described above. Therefore, the other pair of rollers 32*d* convey second drug packaging paper PP2 in a direction inclined with respect to conveyance direction D1 of first drug packaging paper PP1.

Specifically, the other pair of rollers 32*d* convey second drug packaging paper PP2 in such a way that the opened side of the downstream end part of second drug packaging paper PP2 approaches the ridge line R1 side of the upstream end part of first drug packaging paper PP1. When second drug packaging paper PP2 is conveyed to guide member 35, second drug packaging paper PP2 is guided by guide member 35. Describing with reference to the state illustrated in FIG. 8, guide member 35 guides second drug packaging paper PP2 in such a way that as second drug packaging paper PP2 moves leftward, the left end of second drug packaging paper PP2 moves upward.

That is, second drug packaging paper PP2 is guided by inclined part 35*a* of guide member 35 in such a way that as the downstream end part of second drug packaging paper PP2 approaches the upstream end part of first drug packaging paper PP1, the opened side of the downstream end part of second drug packaging paper PP2 approaches the ridge line R1 side of the upstream end part of first drug packaging paper PP1. In other words, the direction in which inclined part 35*a* guides second drug packaging paper PP2 is approximately the same as the direction in which the other pair of rollers 32*d* convey second drug packaging paper PP2. Therefore, second drug packaging paper PP2 is smoothly conveyed and guided without being caught by inclined part 35*a*. In addition, guide member 35 includes recessed part 35*b*, thereby reducing contact of adhesive tape T with guide member 35.

Figure 9:
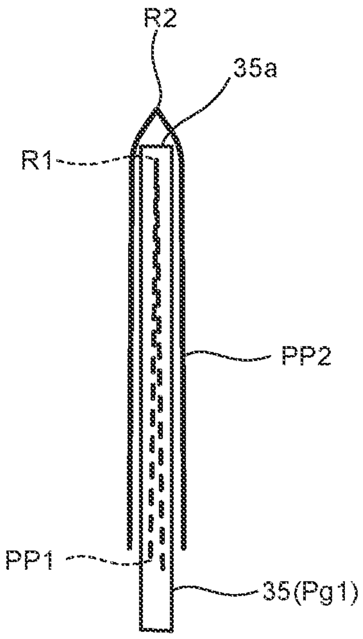
FIG. 9 is a longitudinal cross-sectional view of a guide member and a periphery thereof.
Figure 10:
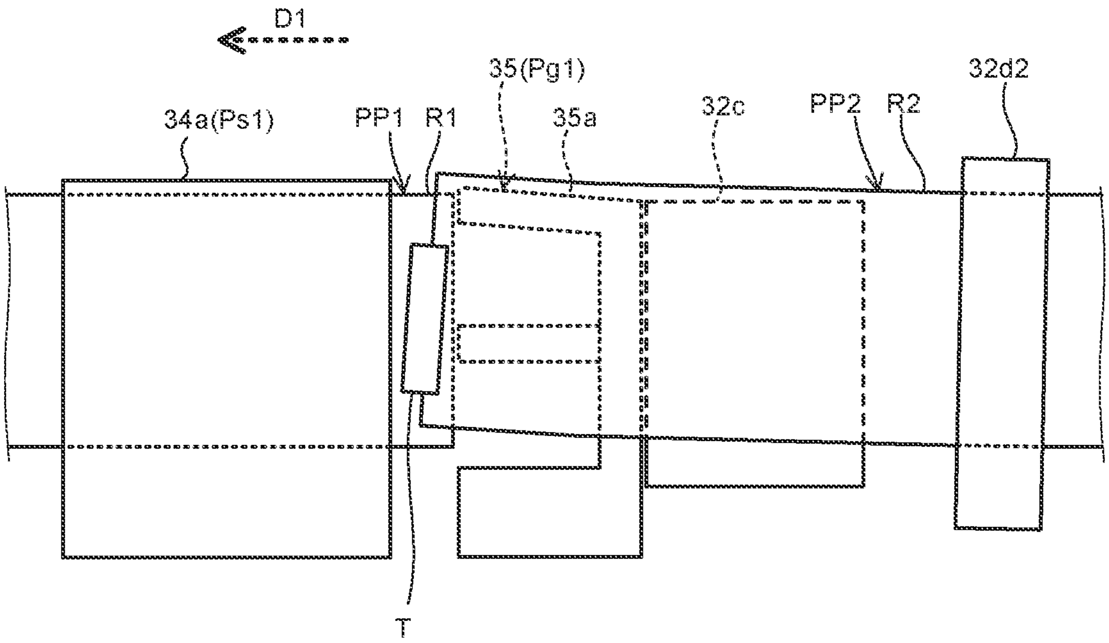
FIG. 10 illustrates a state in which the second drug packaging paper is conveyed and overlaps the first drug packaging paper.

As second drug packaging paper PP2 is conveyed and guided as described above, when second drug packaging paper PP2 is conveyed to the downstream end part of first drug packaging paper PP1, ridge line R2 of second drug packaging paper PP2 is located above ridge line R1 of first drug packaging paper PP1. As illustrated in FIG. 9, a longitudinal cross-sectional view of guide member 35 and a periphery thereof, second drug packaging paper PP2 is wider than the plate thickness of guide member 35. The downstream end part of second drug packaging paper PP2 thus holds, in its inside, the upstream end part of first drug packaging paper PP1, and ridge line R2 of second drug packaging paper PP2 overlaps ridge line R1 of first drug packaging paper PP1, as illustrated in FIG. 10. Second drug packaging paper PP2 is thus smoothly conveyed and guided without the downstream end part of second drug packaging paper PP2 bumping into the upstream end part of first drug packaging paper PP1.

At this time, first drug packaging paper PP1 is held by holding member 34 between the members thereof. Therefore, even when the moving second drug packaging paper PP2 or the moving adhesive tape T comes into contact with first drug packaging paper PP1, first drug packaging paper PP1 can stay at a predetermined position without shifting to the downstream side.

That is, upstream conveying unit 32 conveys second drug packaging paper PP2 in such a way that the opened side of the downstream end part of second drug packaging paper PP2 approaches the ridge line R1 side of the upstream end part of first drug packaging paper PP1. In addition, upstream conveying unit 32 conveys second drug packaging paper PP2 toward first drug packaging paper PP1 in such a way that the downstream end part of second drug packaging paper PP2 holds, in its inside, the upstream end part of first drug packaging paper PP1, and ridge line R2 of second drug packaging paper PP2 overlaps ridge line R1 of first drug packaging paper PP1. Therefore, during the replacement of packaging paper, second drug packaging paper PP2 is smoothly conveyed to overlap first drug packaging paper PP1 while preventing the generation of folds in first drug packaging paper PP1 and second drug packaging paper PP2.

The control part stops the operation of the pair of rollers 32*b* in response to the downstream end part of second drug packaging paper PP2 overlapping the upstream end part of first drug packaging paper PP1. The control part detects that the downstream end part of second drug packaging paper PP2 overlaps the upstream end part of first drug packaging paper PP1 based on a detection signal from a position sensor (for example, an infrared sensor) detecting the position of second drug packaging paper PP2.

Subsequently, the operator manually attaches adhesive tape T to first drug packaging paper PP1, for example. As a result, second drug packaging paper PP2 is connected to first drug packaging paper PP1. The operator then inputs information indicating that second drug packaging paper PP2 is connected to first drug packaging paper PP1 into the operation part. The control part accordingly positions first plate member 34*a* at non-holding position Ps2, guide member 35 at non-guide position Pg2, and driving roller 32*b*1 at non-conveying position Pm2.

Further, when first drug packaging paper PP1 is conveyed by the pair of downstream rollers 33*a* due to the operation by the control part, second drug packaging paper PP2 connected to first drug packaging paper PP1 is also conveyed. When first drug packaging paper PP1 is consumed, the packaging paper conveyed by conveying part 30 is switched to second drug packaging paper PP2. In addition, the downstream end part of second drug packaging paper PP2 holds, in its inside, the upstream end part of first drug packaging paper PP1; therefore, the upstream end part of second drug packaging paper PP2 is not caught by downstream guide member 33*c*. Therefore, switching to second drug packaging paper PP2 is performed smoothly.

The present disclosure is not limited to the embodiment described above. Various variations derived from the present embodiment are also included within the scope of the present disclosure, as long as those variations do not depart from the spirit of the present disclosure.

For example, in the pairs of rollers 32*b* and rollers 32*d*, not only driven rollers 32*b*2 and 32*d*2 but also driving rollers 32*b*1 and 32*d*1 may be disposed to be inclined in the same manner as driven rollers 32*b*2 and 32*d*2. In place of disposing driven rollers 32*b*2 and 32*d*2 so as to be inclined, driving rollers 32*b*1 and 32*d*1 may be disposed to be inclined.

Figure 11:
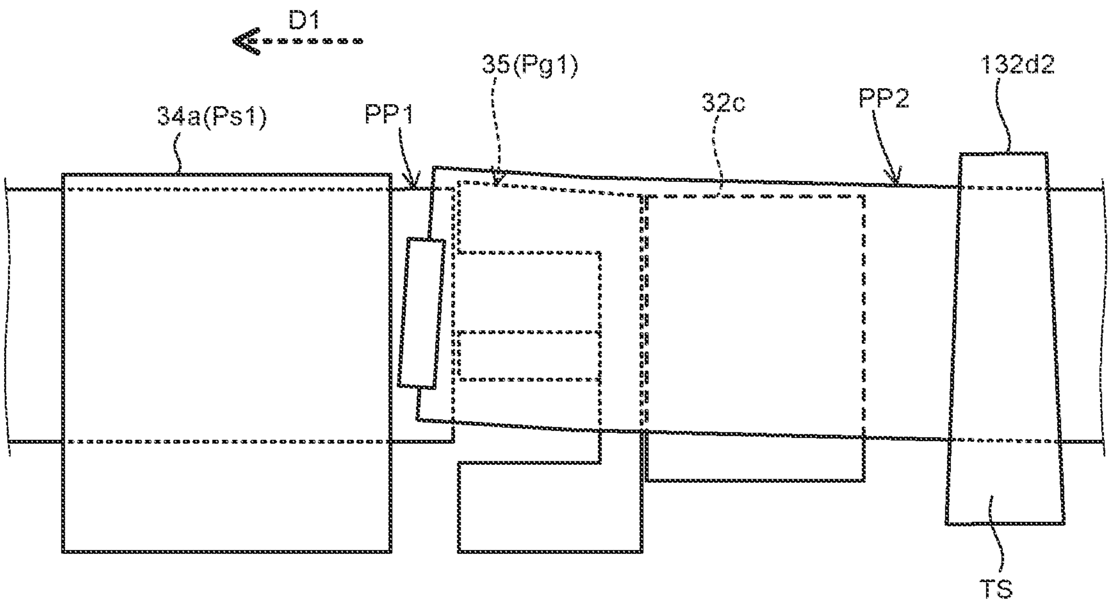
FIG. 11 illustrates a variation of a pair of rollers.

As illustrated in FIG. 11, the following configuration is also possible: the circumferential side surface of driven roller 132*d*2 is tapered surface TS in which the circumferential length on the opened side of second drug packaging paper PP2 is longer than the circumferential length on the ridge line R2 side of second drug packaging paper PP2. Driven roller 132*d*2 is disposed in such a way that the rotational axis thereof is orthogonal to conveyance direction D1 of first drug packaging paper PP1, and tapered surface TS is in line contact with the side surface of second drug packaging paper PP2. Due to this tapered surface TS, second drug packaging paper PP2 is conveyed in such a way that the opened side of the downstream end part of second drug packaging paper PP2 approaches the ridge line R1 side of the upstream end part of first drug packaging paper PP1. At least one of the circumferential side surfaces of driven roller 32*b*2 and driving rollers 32*b*1 and 32*d*1 may be tapered surface TS.

Figure 12:
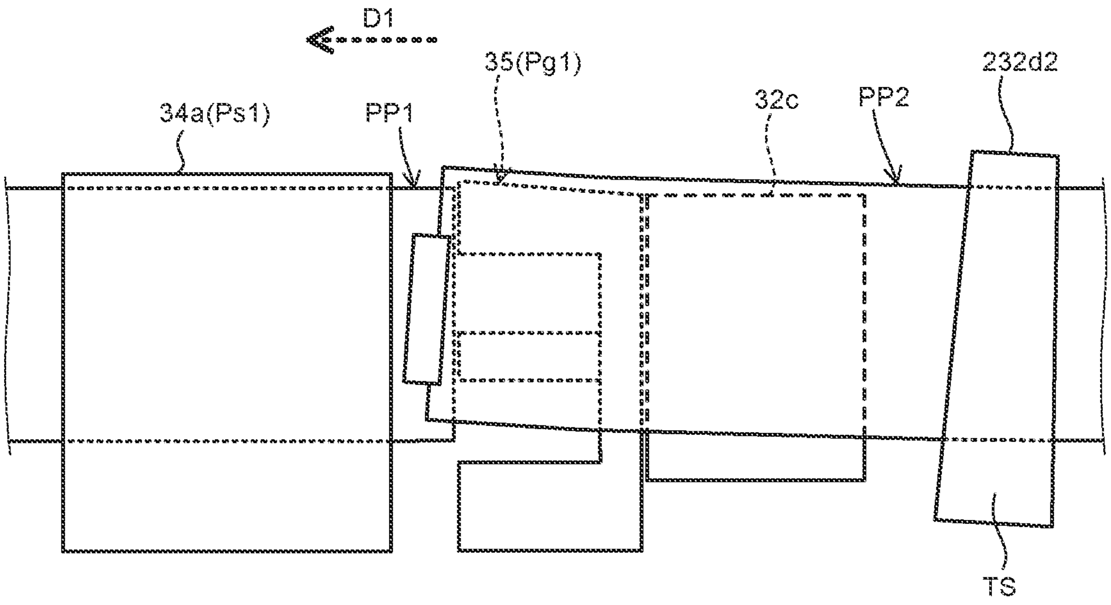
FIG. 12 illustrates a variation of the pair of rollers.

In addition, as illustrated in FIG. 12, driven roller 32*d*2 including tapered surface TS may be disposed in such a way that one end part of driven roller 32*d*2 (on the opened side of second drug packaging paper PP2) is located on the downstream side of second drug packaging paper PP2 from the other end part of driven roller 32*d*2 (on the ridge line R2 side of second drug packaging paper PP2). Regarding the at least one of driven roller 32*b*2 and driving rollers 32*b*1 and 32*d*1 including tapered surface TS, the roller may be disposed in such a way that one end part of the roller (on the opened side of second drug packaging paper PP2) is located on the downstream side of second drug packaging paper PP2 from the other end part of the roller (on the ridge line R2 side of second drug packaging paper PP2).

In addition, conveying part 30 does not need to include second packaging paper holding part 31*b*, the other upstream guide member 32*c*, the other pair of rollers 32*d*, and moving member 32*e*. In this case, at the time of replacing first drug packaging paper PP1 with second drug packaging paper PP2, the operator cuts first drug packaging paper PP1 as described above while holding member 34 holds first drug packaging paper PP1 between the members thereof, and driving roller 32*b*1 is located at non-conveying position Pm2.

The operator then removes first drug packaging paper PP1 from first packaging paper holding part 31*a* and attaches roll M2 of second drug packaging paper PP2 to first packaging paper holding part 31*a*. The operator further disposes the downstream end part of second drug packaging paper PP2 at upstream guide member 32*a*, and attaches adhesive tape T to the downstream end part of second drug packaging paper PP2, as described above.

Subsequently, the operator inputs into operation part 11 information to start conveying second drug packaging paper PP2. In response, the control part moves guide member 35 to guide position Pg1 and positions driving roller 32*b*1 at conveying position Pm1. The control part further rotates driving roller 32*b*1 to convey second drug packaging paper PP2. As a result, second drug packaging paper PP2 is conveyed and guided as described above and connected to first drug packaging paper PP1.

This application is entitled to and claims the benefit of Japanese Patent Application No. 2021-159495 filed on Sep. 29, 2021, the disclosure of which including the specification, drawings, and abstract is incorporated herein by reference in its entirety.

INDUSTRIAL APPLICABILITY

The present disclosure is widely available for drug supply apparatuses.

REFERENCE SIGNS LIST

1 Drug supply apparatus
13 Drug supply unit
30 Conveying part
31 Packaging paper holding part
32 Upstream conveying unit
32*a* Upstream guide member
32*b* Pair of rollers
32*c* Another upstream guide member
32*d* Another pair of rollers
32*e* Moving member
33 Downstream conveying unit
33*c* Downstream guide member
35 Guide member
35*a* Inclined part
PP1 First drug packaging paper
PP2 Second drug packaging paper
Pr Drug delivery position
R1 Ridge line of first drug packaging paper
R2 Ridge line of second drug packaging paper
TS Tapered surface

The invention claimed is:

1. A drug supply apparatus, comprising:

a drug supply unit configured to supply a drug to a drug delivery position;

a downstream conveying unit configured to convey a first drug packaging paper that is strip shaped and folded in half in advance along a longitudinal direction of the first drug packaging paper, wherein the first drug packaging paper is configured to receive a drug at the drug delivery position; and an upstream conveying unit configured to convey a second drug packaging paper that is strip shaped and folded in half in advance along a longitudinal direction of the second drug packaging paper, wherein:

the downstream conveying unit includes a pair of downstream rollers, the upstream conveying unit includes a first upstream guide member, a second upstream guide member, a first pair of rollers, a second pair of rollers, and a moving member, the upstream conveying unit conveys the second drug packaging paper toward the first drug packaging paper in such a way that a downstream end part of the second drug packaging paper holds, in an inside of the downstream end part, an upstream end part of the first drug packaging paper, and a ridge line of the second drug packaging paper overlaps a ridge line of the first drug packaging paper.

2. The drug supply apparatus according to claim 1, wherein the upstream conveying unit conveys the second drug packaging paper in such a way that an opened side of the downstream end part of the second drug packaging paper approaches a ridge line side of the upstream end part of the first drug packaging paper.

3. The drug supply apparatus according to claim 1, wherein the second pair of rollers of the upstream conveying unit is configured to nip and convey the second drug packaging paper.

4. The drug supply apparatus according to claim 3, wherein at least one roller of the second pair of rollers is disposed in such a way that one end part of the at least one roller is located on a downstream side of the second drug packaging paper from another end part of the at least one roller, the one end part being on an opened side of the second drug packaging paper, the other end part being on a ridge line side of the second drug packaging paper.

5. The drug supply apparatus according to claim 3, wherein a circumferential side surface of at least one roller of the second pair of rollers is a tapered surface with a circumferential length on an opened side of the second drug packaging paper longer than a circumferential length on a ridge line side of the second drug packaging paper.

6. The drug supply apparatus according to claim 1, further comprising:

a guide member configured to guide the second drug packaging paper while the guide member is sandwiched by the second drug packaging paper, wherein the guide member has a shape allowing the guide member to guide the second drug packaging paper in such a way that as the downstream end part of the second drug packaging paper approaches the upstream end part of the first drug packaging paper, an opened side of the downstream end part of the second drug packaging paper approaches a ridge line side of the upstream end part of the first drug packaging paper.

7. The drug supply apparatus according to claim 6, wherein the guide member includes an inclined part extending in a direction substantially parallel to the ridge line of the second drug packaging paper guided by the guide member.

8. The drug supply apparatus according to claim 6, wherein the guide member is plate shaped.

* * * * *